Figure 1:
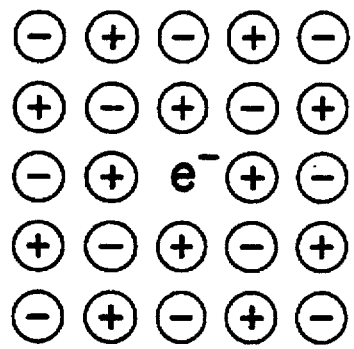

United States Patent [19]

Serole

[11] Patent Number: 5,700,408
[45] Date of Patent: Dec. 23, 1997

[54] METHOD OF PRODUCING A CERAMIC COMPONENT BY SINTERING

[75] Inventor: Bernard Serole, Peyrins, France

[73] Assignee: W.C. Heraeus GmbH, Germany

[21] Appl. No.: 523,813

[22] Filed: Sep. 5, 1995

[30] Foreign Application Priority Data

Sep. 7, 1994 [FR] France .................................. 94 10875

[51] Int. Cl.$^6$ .................................................. C04B 33/32
[52] U.S. Cl. .................................................. 264/65; 264/82
[58] Field of Search .................................. 264/56, 65, 82

[56] References Cited

U.S. PATENT DOCUMENTS

| | | | |
|---|---|---|---|
| 4,107,392 | 8/1978 | Aoki et al. | 428/547 |
| 4,735,925 | 4/1988 | Kato et al. | 501/107 |
| 4,981,633 | 1/1991 | Alles et al. | 264/65 |
| 5,433,901 | 7/1995 | Rancoule et al. | 264/28 |
| 5,531,948 | 7/1996 | Schlott et al. | 264/122 |

FOREIGN PATENT DOCUMENTS

| | | |
|---|---|---|
| 0 354 963 | 2/1990 | European Pat. Off. . |
| 40 39 182 | 6/1991 | France . |
| 38 11 695 A1 | 10/1989 | Germany . |

OTHER PUBLICATIONS

Database WPI, Section Ch, Week 8122, Derwent Publications Ltd., London, GB; JP-A-50 157 406 (KAGAKU GIJUTSU-CHO), 19 Dec. 1975, Abstract only.

Database WPI, Section Ch, Week 8928, Derwent Publications Ltd., London, GB; JP-A-01 138 171 (TOSHIBA TUNGALLOY KK), 31 May 1989, Abstract only.

Database WPI, Section Ch, Week 8542, Derwent Publications Ltd., London, GB; JP-A-60 170 903 (TAIYO YUDEN KK), 4 Sep. 1985, Abstract only.

Database WPI, Section Ch, Week 9310, Derwent Publications Ltd., London, GB; SU-A-1 722 805 (UKR REFRACTORIES RES INST), 30 Mar. 1992, Abstract only.

Database WPI, Section Ch, Week 9252, Derwent Publications Ltd., London, GB; SU-A-1 704 920 (ROVENO PEDAGOGY INST), 15 Jan. 1992, Abstract only.

Derwent Accession No. 85-305865 [49] WPINDEX of JP-A-60 210541 (HITACHI CABLE), 23 October 1985, Abstract only.

W.J. Smothers et al, *Journal of the American Ceramic Society*, vol. 37, No. 12 (1954), "Sintering and Grain Growth of Alumina", pp. 588–595 DERWENT ABSTRACT of DE 3811695.

*Primary Examiner*—Christopher A. Fiorilla
*Attorney, Agent, or Firm*—Frishauf, Holtz, Goodman, Langer & Chick, P.C.

[57] ABSTRACT

In order to achieve, proceeding from the known methods of producing a ceramic component by sintering, in which an oxygenous ceramic powder is introduced into a sintering chamber, heated in there, and dense sintered under application of a halogen-containing sintering auxiliary agent, a simple and inexpensive method in which the oxygen stoichiometry of the sintered component can easily be adjusted to a given value, it is proposed to have the sintering auxiliary agent released from a reservoir separated from the green body at a given sintering temperature, the halogen superficially reacting with the ceramic powder separating oxygen, and the separated oxygen or a defined part of the separated oxygen being caught by way of an oxygen getter.

9 Claims, 2 Drawing Sheets

METHOD OF PRODUCING A CERAMIC COMPONENT BY SINTERING

The present invention relates to a method of producing a ceramic component by sintering, in which an oxygenous ceramic powder is introduced into a sintering chamber, in which it is heated and dense sintered using a halogen-containing sintering auxiliary agent.

Such a method is known from patent EP-A1 0354 963. Here a method of producing a superconductive ceramic component, in which oxidic powders of rare-earth metals and of copper as well as powders of alkaline earth metal oxides or alkali carbonates as well as of a fluoride are mixed, formed into a green body and sintered subsequently. The fluorine-containing powder acts as a sintering auxiliary agent. The fluorides of copper, barium and yttrium have proved to be especially suitable for the known method. On sintering the powder mixtures such fluorides are inserted into the ceramic component.

The effect of the fluorides as sintering auxiliary agents in the known method depends on the size distribution of the powders. Homogenous sintering can only be achieved with fine-particle powder and with a sufficiently good thorough mixing of the powders. A defined change and adjustment of oxygen stoichiometry within the component is impossible.

In another method of the type mentioned—according to patent SU-A1 17 22 805—it is proposed for the production of a high-tensile ceramic coating on steel tools to mix powders of aluminum oxide and neodymoxide with magnesium chloride-hexahydrate and to sinter them. During sintering the magnesium salt decomposes forming magnesium chloride. During this process chlorine is released, and magnesium chloride develops. In connection with neodymoxide this acts as a sintering auxiliary agent. In this method the cation of the chlorine-containing salt, i.e. magnesium, remains within the ceramic coating. Thereby additional impurities may be introduced into the ceramic.

In another method according to patent JP-A 602 105 41 the continuous introduction of a halogen into the sintering furnace is known for sintering $SiO_2$ powder for the production of a preform for drawing optical fibers. For this, a suitable gas supply has to be made available. Because of the halogens' toxicity for humans and their chemical reactivity special safety measures are required for such a gas supply, and for the installation of the corresponding pipes, valves, etc. special materials have to be used. Thus, the known method requires a costly and expensive gas supply.

Therefore, the invention is based on the task to find a method for sintering oxide-containing powders which is simple and inexpensive and in which the oxygen stoichiometry of the sintered component can easily be adjusted to a given value.

According to the invention this task is met proceeding from the method mentioned above in such a way that the sintering auxiliary agent is released at a given temperature from a reservoir which is separated of the green body and connected to the sintering chamber, the halogen reacting superficially with the ceramic powder and separating oxygen, and that the separated oxygen or a defined part of the separated oxygen is collected by means of an oxygen getter.

The halogen is released from the reservoir. The release of halogen takes place during sintering at or beginning at a defined temperature. The reservoir can be, for example, an accumulation of a chemical compound of the halogen to be released, which decomposes thermally at a defined temperature. This chemical compound can be arranged within a container. The reservoir is connected to the sintering chamber. For this purpose it can be arranged within the sintering chamber. Due to the circumstance that the reservoir is separated from the green body no contamination of the green body by the chemical compound will take place. For the separation between reservoir and green body in the sense of the invention it is sufficient to arrange the reservoir in such a way that the simple removal of the green body after sintering is possible. Thus, the reservoir can be arranged immediately at the surface of the green body. Apart from the halogen reacting with the surface of the ceramic powder, the chemical compound makes no difference for the chemical structure of the component. The halogen causes an activation of the surface of the ceramic powder, thus simplifying dense sintering. During this process halogen can also diffuse into the powder material and can be embedded in it solidly. This, however, is regularly limited to the area of the powder surface and only slightly changes the chemical structure of the ceramic powder.

The halogen is released only beginning from a defined, given temperature. This simplifies the reproducible adjustment of the method and furthermore offers the advantage that below such temperature the handling of the reservoir is especially easy. It can, for example, easily be filled with a chemical compound containing the halogen, and if required this compound can be introduced into the sintering chamber. There is no risk of poisoning.

In the superficial reaction of the ceramic powder with the halogen oxygen is released and partially replaced by halogen. The released oxygen is caught by means of a suitable getter and thus removed from the reaction balance. In this way, the oxygen partial pressure within the sintering chamber during sintering and thus the desired degree of oxidation of the component to be produced can be adjusted with great exactness. For this purpose merely the capacities of the halogen reservoir and the oxygen getter have to be coordinated in consideration of the stoichiometric oxygen content of the component.

Any powder having an oxidic surface can be used as ceramic powder. A starting powder suitable for the method according to the invention can for example have a metallic core surrounded by an oxidic envelope.

A method in which the reservoir contains a halogenide from which a halogen is released by thermal decomposition of the halogenide has proved to be especially successful. The halogenide is easy to handle at temperatures below the decomposition temperature. Absolutely safe and non-poisonous halogenides can be used. The release of halogen is reproducibly determined by the constant decomposition temperature.

A reservoir containing $CrF_3$ has proved to be especially suitable. This is a safe and inexpensive chemical compound with a decomposition temperature of 850° C.

A method is preferred in which the reservoir is arranged within the sintering chamber. This can easily be realized. No additional pipes leading to the sintering chamber or openings in the sintering chamber are required. The sintering chamber presents a closed system, and therefore it is of advantage that the oxygen getter is likewise arranged within the sintering chamber. An especially preferred oxygen getter contains a reducing agent reacting with the oxygen at the sintering temperature by forming an oxide. Materials with this property are generally known, cheap in production, and easy in handling. Preferably, a reducing agent is chosen in which the oxide is present at sintering temperature in a solid state of aggregation. This has the advantage that the oxide is held completely separate from the balance reactions developing during sintering and is removed from the chemical balance. Furthermore, contaminations of the component, for example, by gaseous oxidic compounds, are impossible. In this respect, metallic titanium has proved to be an especially good getter material.

In another preferred type of application of the method according to the invention an oxygenous compound, from which oxygen is released at sintering temperature through decomposition of the oxygenous compound, is arranged within the sintering chamber and separate from the component. This method results in an additional degree of freedom with the adjustment of the desired oxygen stoichiometry of the component. It can, for example, also be applied in such a way that during sintering of the component the oxygen getter reacts at a first temperature and the release of oxygen from the oxygenous compound takes place at another temperature.

A method according to the invention in which a mixed crystal powder or a powder mixture of indium and tin oxide is used as ceramic powder has proved to be successful.

Figure 2:
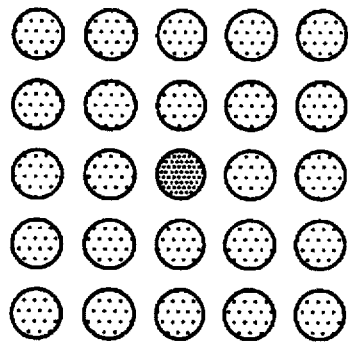
Figure 3:
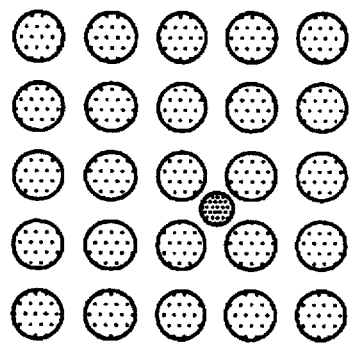
Figure 4:
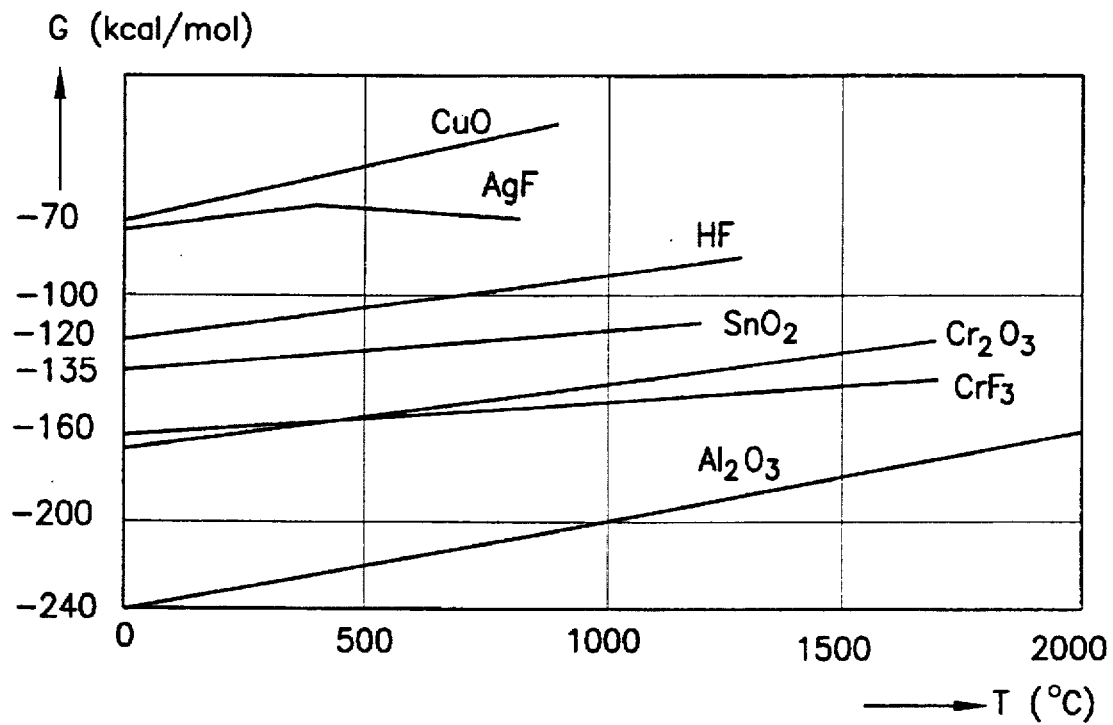
Figure 5:
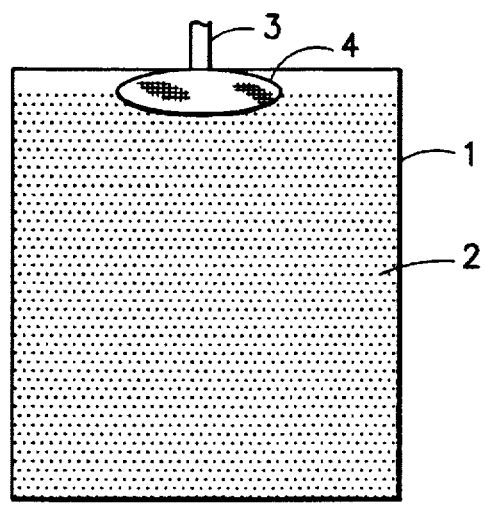

Embodiments of the method according to the invention are explained in detail in the following by way of the patent drawing. In diagrammatic view of the drawing the individual figures show in detail:

FIG. 1: a molecular lattice with Schottky defect,

FIG. 2: a molecular lattice of a substitution mixed crystal,

FIG. 3: a molecular lattice with Frentel defect,

FIG. 4: a diagram showing free enthalpy of formation of various fluorides and oxides dependent on temperature, and FIG. 5: an arrangement for execution of the method according to the invention.

In the method according to the invention a halogen released by decomposition reacts during sintering with the surface of the powder, and during or subsequent to sintering the oxygen partial pressure is controlled in such a way that the stoichiometry of the product can be controlled exactly.

Experience has shown that the stabilization of the ceramic powder during sintering can be influenced selectively by slight changes of the composition in the area of stoichiometric oxygen content.

In a method used at present for the production of solid ceramic parts the powder is pressed under the appropriate temperature and pressure conditions. For this purpose, the powder is put into a receptacle, a female mould, a mould, a container, or another tool well known among those skilled in the art. The powder is impinged on with great pressure so that the grains are tightly pressed. In this process the yielding point of the material is exceeded. Through displacement the grains can be arranged in a new way, they can be deformed in the plastic field, and they can also be broken. In this way the material density increases, as well as the sum of the intergranular areas of contact. Such areas of contact are the precondition for the subsequent hardening phase. After that the powder is heated to an appropriate temperature at which a lattice diffusion takes place in the material which is present as solid matter. Depending on the type of pressing uniaxial and isostatic methods and their variations are differentiated. Depending on temperature a difference is made between methods in solid or fluid phases. In this invention reference is made mainly to the first-mentioned methods, because with these methods a better contamination control of products with a high percentage purity can be achieved via the side walls. The sintering temperature can, for example, be at approximately 80% of the melting temperature. In these conditions the sintering process is sufficiently known, at least theoretically. Here material transport types with graded valency in respect of surface and volume are differentiated. In any case this process results in the formation of intergranular bridges starting at the points of contact and spreading increasingly, while the pore volumes proportionally decrease and maybe even vanish completely. Here the density can achieve asymptotically a value of 100%. This value then represents the theoretical density of the melted body.

By means of vacuum treatment densities can be realized in principle which are very close to the theoretical density. The pattern for the formation of intergranular bridges is known. The bridges are supplied with material in respect of surface and volume by way of solid matter diffusion and in the gaseous phase by way of transport.

The formation of bridges can take place slowly and accidentally. The same is true for their growth and the forming back of the pore volumes. Mostly these phases are slowed down by surface coating of the grains. These coatings consist of oxides, absorbed or adsorbed gases, deposited external or internal impurities which are pressed to the intergranular joints.

With the method according to the invention these disadvantageous aspects, i.e. the slow and accidental formation of intergranular joints, can be avoided. This is because it is possible with this method to have the diffusion phase take place with precision in any conditions in respect of time, temperature, and pressure, and to control it by increasing or reducing its rate. The result is a product with density and homogeneity of the highest quality. Furthermore, the method offers the advantage of saving energy because of abridgment of reaction time.

With the method according to the invention above all massive parts can be produced by hardening of ceramic oxide powders such as $Al_2O_3$, $Bi_2O_3$, $TiO_2$, PbO, $SnO_2$, ZnO, $In_2O_3$, MgO etc., or mixtures among these powders.

Let's take for example the ceramic oxide $SnO_2$. With stoichiometric, i.e. theoretical, composition it contains:

| | | |
|---|---|---|
| | Sn: | 33.33 atom %; 78.77 weight %; 36.68 volume % |
| and | O: | 66.66 atom %; 21.23 weight %; 63.32 volume %, | i.e. 1.6 standard liters of oxygen per kg tin oxide or 787 g tin metal.

Now a large number of compositions is known in which there are slight stoichiometric deviations. If NiO is present stoichiometrically, it is pale green. When heated in oxygen it gets darker, sometimes even black.

Adding oxygen in the form of $O_{2-}$ leads to the formation of holes with positive loading. Iron oxide FeO likewise is never present stoichiometrically its notation can be up to $Fe_{0.25}O$. This is similarly true for wolframate $NaWO_3$. Thus, it is evident that stoichiometry can sometimes certainly vary, at least in a defined field.

In FIG. 1 the development of a defect by loss of an atom is described which is replaced by a released electron. In this case the product is under-stoichiometric (Schottky defect).

FIG. 2 describes how a foreign atom settles into a gap and re-establishes stoichiometry.

FIG. 3 describes on the contrary how a foreign atom settles in a clearance. This causes the product to be over-stoichiometric (Frentel defect).

One goes on the assumption that a change of stoichiometry, above all by loss of oxygen, has a strongly activating effect on the sintering process. The loss of even very little oxygen, above all if it occurs at the surface of the powder grains, increases the mobility of atoms and electrons. The released metal atoms have a solid-matter-solid-matter-diffusion rate which exceeds many times over the rate of the same atoms in the oxide. The dimension of this rate can be assumed at 80% of the melting temperature in degree Celsius with several dozens um/hour.

Furthermore, these dislocations result in tensions which favor movements at high temperatures and thus sintering of powder grains.

The exact method for the execution of this stoichiometric movement is based on the following principle: oxygen does not necessarily play a part in the oxidation reductions. For example the reaction (a)

$$Mg+Cl_2 \rightarrow Mg^{++} + 2\ Cl^- \tag{a}$$

presents an oxidation reduction of magnesium which is characterized by a loss of electrons. Contrary to this, halogen is an electron acceptor. That is to say the oxidation agent was reduced. This results in the following definition:

The reduction agent is an electron donor.
The oxidation agent is an electron acceptor.

As a consequence halogens and especially the most active halogen, fluorine, were in generally used in the method according to the invention. Fluorine, the ninth element of the classification of elements, has got a basic electron structure of the type 1s2, 2s2, 2p5 which enables it to take up an electron. Furthermore, the F-molecule acquires a great reactivity because of its great ability to separate. It enters into a combination with almost all metals and with oxygen and can take the part of oxygen, which leads to the development of oxifluorides. Fluorine reacts with ceramic. Even traces being released in the powder at sintering temperature represent an effective activation. Such a reaction with the surface of the ceramic powder takes place for example by way of the following chemical equation:

$$SnO_2 + 4F \rightarrow SnF_4 + O_2 \tag{b}$$

SnF$_4$ sublimates at 700° C. and at a pressure of 1 bar, its action thus being limited to a temporary role as trigger of reaction.

The method according to the invention includes production of a small amount of atomic fluorine at a time when there are certain temperature and pressure conditions.

For this, the method of decomposition of a suitable metal fluoride is chosen.

In FIG. 4 the free enthalpy of formation of certain fluorides and oxides is described. On this basis the material can be chosen which decomposes in the conditions corresponding to the manufacture cycle of the examined product. Here enthalpy is as follows:

$$H=U+pV,$$

with U=interior energy of the compound, p=pressure, V=volume.

And entropy is as follows:

$$S=\int dQ/T,$$

with Q being the heat exchanged with the surroundings and T the temperature in degrees K.

Thus, free enthalpy G is:

$$G=H-TS.$$

The free enthalpy gives the energy necessary for the reaction delta H<O, the reaction being exothermic in this case. The positive entropy delta S>O shows that the reaction is spontaneous.

Therefore, chromium fluoride in a vacuum decomposes almost precisely at the time a temperature of 850° C. is reached. Chromium steam precipitates while the monoatomic fluorine reacts with the ceramic.

Mathematically the following components of CrF$_3$ can be determined:

Cr: 25 atom %; 47.70 weight %; 16.03 volume %
F: 75 atom %; 52.30 weight %; 83.97 volume %.

It follows that 1 g CrF$_3$ releases 0.52 g fluorine beginning at a temperature of 850° C., i.e. approximately 0.6 liter at a pressure of 1 bar and a temperature of 298K, sufficient for triggering the sintering process of several dozens kilos of oxides. This is because industrial powder usually has a specific surface of between 0.1 and 1 m²/g. Here it is sufficient to have react the grain surfaces of some atom series to achieve a sintering process which is efficient by many times more.

The second part of the method according to the invention is to act upon the released oxygen to control its partial pressure P$_{O2}$ in the reaction space.

This results in the reaction:

$$aA + bB \underset{2}{\overset{1}{\rightleftarrows}} cC + dD \tag{c}$$

The equilibrium constant K, expressed as a function of the mole fraction X, can be represented as follows:

$$K_x = X_C^c \cdot X_D^d / X_A^a \cdot X_B^b = K_p \cdot p^{-\Delta n}$$

If the temperature is constant during release of oxygen, that is to say for example 850° C., we find:

$$\delta \log K_x / \delta p = -\Delta n/p,$$

K$_x$ being an increasing function of pressure. The system is displaced and reaches a new equilibrium in which the relation $X_C^c \cdot X_D^d / X_A^a \cdot X_B^b$ is bigger than in the beginning.

The system is displaced in the direction described as 1 in the above equilibrium reaction. In case of increase of pressure the system reacts by a reduction of the total number of molecules, the pressure increase thus being weakened.

In the first case the method according to the invention results in a slightly under-stoichiometric sintering process. Thus, for example, in hardening tin oxide the oxygen content is reduced from Sn . . . 78.77 weight %
O . . . 21.23 weight % to . . . 21 weight % then 2.3 g, i.e. 1.6 standard liters of oxygen per kilogram oxide are released in the sintering chamber. This causes a high oxygen partial pressure at 850° C. in a relatively small sintering chamber. The method proposes absorption of oxygen. For this purpose, metal powder is put into a small bag. If, for example, titanium is used as a powder to bind the oxygen as TiO$_2$ and if all the 1.6 standard liters of oxygen gas are to be bound, the following applies:

Ti . . . 33.33 atom % . . . 59.95 weight % . . . 3.4 g

That is to say that a bag with 3.4 g titanium powder is put into the sintering chamber, separate from the ceramic powder.

In the method according to the invention it is proposed for the first case to limit the reaction by increase of the oxygen partial pressure.

Furthermore, it is proposed that an exactly calculated amount of oxygen is absorbed so that a new equilibrium is achieved at a previously determined, lower stoichiometric stage regarding the oxygen content in the sintered component.

In a variation of the method it is proposed to release additional oxygen to keep up the original stoichiometric oxygen relation of the starting powder. In the same temperature range a substance can be added, as for example, an easily decomposing oxide, which releases oxygen. If 1.6 standard liters of oxygen are to be added, for example, copper oxide CuO can be used which disintegrates into the following constituents:

| | | | |
|---|---|---|---|
| Cu | 50 atom % | 79.88 weight % | 9.13 g |
| O | 50 atom % | 20.12 weight % | 2.3 g |
| total CuO | | | 11.43 g |

Thus, 11.4 g copper oxide have to be added.

The method according to the invention is based on the hardening of ceramic oxides by stoichiometrically changing the oxygen content. The first part consists of triggering a reaction by release of a halogenide, for example, in which the halogenide reacts with the ceramics releasing oxygen. The second part consists of bringing the oxygen partial pressure to a previously determined value: by linking to another substance, if it is to be reduced, or by decomposition, if it is to be increased. Both parts of the method can be applied independent of each other, or both together, one after the other or simultaneously.

As already shown in the general theoretical consideration on oxidation the method according to the invention does not have to be limited to ceramic oxides resp. to changing the oxygen content in such oxides. It can likewise be used for non-oxidized ceramic, nitrides, and other substances as well as for mixtures of various types of ceramics. In the latter case the mixture has to be especially homogenous, and instead of a mixture a leaded zinc oxide is to be used by preference.

The production of tin oxide $SnO_2$ which has already been mentioned in this invention can be an example for its industrial application. Materially and depending on the desired quality the production can be as follows:

pressing or extruding of a paste with subsequent baking, isostatic hot pressing in the vacuum container, uniaxial hot pressing in the vacuum container.

Another embodiment of the method according to the invention is explained in detail by way of FIG. 5:

100 kg tin oxide powder ($SnO_2$) 2 are put into a metallic container 1 with a diameter of 235 mm and a height of 600 mm. The original relative powder density amounts to approximately 60%. The container is evacuated by means of pump 3 and shut afterwards as soon as air and moisture have been pumped out completely. That is to say, it is a method within a closed system.

After isostatic hot pressing a work piece with a diameter of 190 mm and a height of approximately 500 mm, a theoretical density of 7.20 and a weight of 100 kg is to be produced. For sintering a bag 4 made of wire cloth with a mesh size of approximately 25 mm, containing 10 g chromium fluoride ($CrF_3$) is put into the container 1. At decomposition at approximately 850° C. this quantity of chromium fluoride releases approximately 12 standard liters of fluorine. Furthermore, approximately 340 g titanium powder are put into the bag 4, which is able to take up 230 g resp. 161 standard liters of oxygen. The oxygen is released by tin oxide powder 2 when it reacts superficially with the fluorine released from $CrF_3$.

In the course of this hot pressing the oxygen stoichiometry of the sintered work piece is reduced from 21.23 to 21.0 weight %. By binding the oxygen to the titanium powder bloating of the container during heating is avoided. The temperature is brought to at least 850° C. so that the reaction is triggered, and afterwards pressing is made using a customary method well known among those skilled in the art.

I claim:

1. A method of producing a ceramic component by sintering, in which an oxygenous ceramic powder is formed into a green body which is introduced into a sintering chamber, heated in there, and dense sintered under application of a halogen-containing sintering auxiliary agent, characterized in that at a given sintering temperature the sintering auxiliary agent is released from a reservoir arranged separately from the green body, the halogen superficially reacting with the ceramic powder separating oxygen, and that the separated oxygen or a defined part of the separated oxygen is caught by means of an oxygen getter.

2. A method according to claim 1, characterized in that the reservoir contains a halogenide out of which the halogen is released by thermal decomposition of the halogenide.

3. A method according to claim 1, characterized in that the reservoir is arranged within the sintering chamber.

4. A method according to any claims 1, characterized in that the oxygen getter is arranged within the sintering chamber and contains a reduction agent which reacts with the oxygen at sintering temperature forming an oxide.

5. A method according to claim 4, characterized in that a reduction agent is chosen in which the oxide is present at sintering temperature in a solid state of aggregation.

6. A method according to claim 1, characterized in that within the sintering chamber and separated from the component there is an oxygenous compound from which oxygen is released at sintering temperature through decomposition of the oxygenous compound.

7. A method according to claim 1, characterized in that the reservoir contains $CrF_3$.

8. A method according to any one of the above claim 1, characterized in that the oxygen getter contains metallic titanium as a reduction agent.

9. A method according to claim 1, characterized in that a mixed crystal powder or a powder mixture of indium/tin oxide is used as ceramic powder.

* * * * *